Jan. 5, 1965     H. S. RALPH     3,164,374
APPARATUS FOR PRODUCING WHIPPED FOAM
Filed April 19, 1961     3 Sheets-Sheet 1

INVENTOR.
Herman S. Ralph
BY Carl A. Stickel
His Attorney

INVENTOR.
Herman S. Ralph
BY Carl A. Stickel
His Attorney

Jan. 5, 1965     H. S. RALPH     3,164,374
APPARATUS FOR PRODUCING WHIPPED FOAM
Filed April 19, 1961     3 Sheets-Sheet 3

INVENTOR.
Herman S. Ralph
BY Carl A. Stickel
His Attorney

United States Patent Office 3,164,374
Patented Jan. 5, 1965

3,164,374
APPARATUS FOR PRODUCING WHIPPED FOAM
Herman S. Ralph, Dayton, Ohio, assignor to General Motors Corporation, Detroit, Mich., a corporation of Delaware
Filed Apr. 19, 1961, Ser. No. 104,104
9 Claims. (Cl. 259—2)

This invention pertains to apparatus for producing foamed resins and particularly to apparatus for producing foamed products from latex of various kinds.

Large quantities of latex foam rubber are now being manufactured continuously by several well known processes including the Dunlop process. The continuous foaming process greatly increases the output but has the disadvantage of wasting much material when there is only intermittent demand for the output such as when small molds are to be filled. It has been considered impossible to operate the continuous foaming processes such as the Dunlop process intermittently because of the difficulty in maintaining the formula and the uniformity. One of the difficulties is that it has been necessary to purge the whole system when it is shut down. Another of the difficulties is caused by the compressible properties of the mixture after the air has been introduced to the latex. Another difficulty is that the ingredients tend to congeal, separate or settle out in various parts of the system.

It is an object of this invention to provide fluid flow apparatus for foaming processes such as the Dunlop process for latex foam in which the foam can be generated intermittently at will for as long a period as desired without adversely affecting its uniformity.

It is another object of this invention to provide a fluid flow apparatus according to the Dunlop process in which the ingredients are kept in suspension by recirculation when not needed and in which the supply of the aerated latex mixture is maintained under pressure at all times without the possibility of coagulation in the supply conduits and passages.

It is another object of this invention to provide a fluid flow apparatus in which the conduits and valves and control system are arranged and controlled in such a way as to prevent coagulation, settling and separation therein.

These and other objects are attained in the form shown in the drawings in which three recirculating pump systems are each provided with a three-way valve having one position for recirculation and one position for delivery into the system. Concentrated latex is recirculated in the first circuit and upon energization of its three-way solenoid valve delivers the latex to a continuous automatic foamer simultaneously with air which is delivered under pressure by the opening of its solenoid valve to the continuous foamer. The continuous foamer delivers its output of latex foam under pressure to a blender. Recirculating in the second circuit are one or more materials affecting vulcanization such as zinc oxide and any materials affecting age resistance, stability and any pigments, fillers, softeners, anti-oxidants, thickeners or colors. The three-way solenoid valve for the second circuit is energized simultaneously with the solenoid valves for the air and the first circuit to deliver its material into the blender for flow to the foam head. The third recirculating pump circuit has its pump operated in direct proportion to the pump of the second circuit and its three-way valve is simultaneously energized with the three-way valves previously mentioned to deliver the gelling agent to the foam head under the control of the pistol type switch provided upon the foam head which simultaneously energizes all of the solenoid valves. The pistol grip switch on the foam head also energizes an air valve which operates an air cylinder in the foam head to consecutively open first the valve for the foam mixture and second the valve for the gelling agent which together discharge directly into the mixing chamber provided with a beater. The mixing chamber has a discharge outlet at the bottom discharging directly into the mold. Upon the opening of the pistol grip switch, all solenoids are deenergized providing recirculation in all three circuits and the valve for the gelling agent and the valve for the foam mixture are closed consecutively in the order mentioned to stop the discharge of the foam while the supply of the components is kept under pressure.

Further objects and advantages of the present invention will be apparent from the following description, reference being had to the accompanying drawings wherein preferred embodiments of the present invention are clearly shown.

Figure 1:
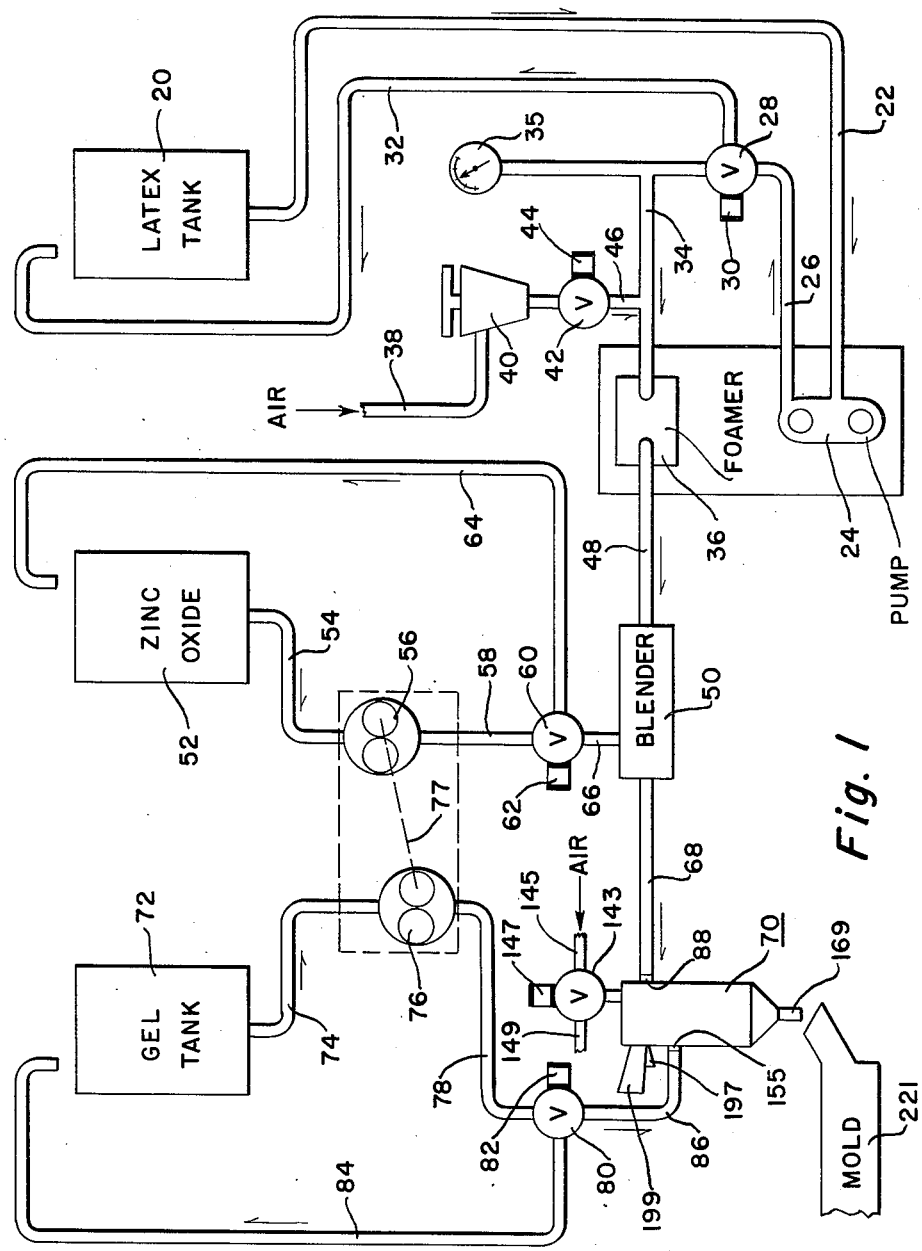
FIGURE 1 is a diagram of one form of controllable fluid flow apparatus for carrying out the continuous Dunlop process embodying my invention.

Referring now to the drawings, and more particularly to FIGURE 1, there is shown diagrammatically a controllable system for producing foam. A latex tank 20 containing compounded concentrated latex is connected by a supply conduit 22 to a material feed pump 24 provided with a variable speed control. This pump 24 connects to the conduit 26 to the solenoid operated three-way valve 28 shown in detail in FIGURE 5. When its operating solenoid 30 is deenergized, the valve 28 recirculates the concentrated latex and returns the output of the pump 24 through the return conduit 32 to the latex tank 20. When the solenoid 30 is energized, the three-way valve 28 delivers the concentrated latex through a conduit 34 into a continuous automatic foamer 36. The pressure in the conduit 34 is measured by a gauge 35. The foamer 36 may be an Oakes continuous automatic foamer or mixer manufactured by the American Machine and Foundry Company or it may be a foamer of the type shown in the Keen Patent 2,295,740 issued September 15, 1942. Air under a pressure of 100 lbs. per square inch or more is supplied through an air supply conduit 38 to an air pressure regulator 40 which controls the supply of air to the valve 42 operated to open position by the solenoid 44 for delivering air through the conduit 46 into the foamer 36. The air and latex may enter the foamer 36 through a single pipe as in the Oakes foamer or through separate pipes as in said Keen patent.

In the foamer 36, the air and concentrated latex are mixed in the proper proportions and beaten into a froth or foam. The output of the foamer 36 is delivered through the conduit 48 to a blender 50. The output of the second recirculating circuit also delivers into the blender 50. This second recirculating circuit includes a tank 52 containing suspensions and emulsions of one or more of the various compounding ingredients desired. This second recirculating circuit may contain a slurry composed of water and one or more dispersing agents such as Darvan #1, emulsifying agents, stabilizers, thickeners, wetting agents, vulcanizing agents such as sulphur, cure activators such as zinc oxide, organic accelerators, anti-oxidants, loading materials, softeners and dyes and pigments. These are embodied in suspensions and emulsions and discharged into the tank 52. The outlet of the tank 52 connects through the conduit 54 to a pump 56 whose outlet connects through the conduit 58 to the three-way solenoid operated valve 60. When the solenoid 62 for the valve 60 is deenergized, the material is recirculated through the conduit 64 back to the tank 52. This recirculation is continuous when the solenoid 62 is deenergized. However, when the solenoid 62 is energized, the valve 60 delivers the contents through the conduit 66 into the blender 50. The control of the pumps 56 and 24 as well as the regulation of the air pressure by the regulator 40 assures the proper proportions of these ingredients being delivered under pressure to the blender 50 where they are thoroughly mixed and delivered under pressure through the conduit 68 to the first inlet 88 of the foam head 70. In the apparatus thus far described, the ingredients may be kept in active circulation for considerable periods without any substantial deterioration or tendency to congeal materials.

The gelling agent such as an aqueous dispersion of sodium silico-fluoride suspended with diatomaceous earth is provided in the third recirculating circuit. The gelling or coagulation agent is discharged into the gel tank 72. The outlet of this tank 72 is connected through the discharge conduit 74 and to a pump 76 which is interconnected with the pump 56 so that they will operate in proportion or in a desired ratio through the connection 77. The outlet of the pump 76 connects through the conduit 78 with a three-way valve 80 operated by a solenoid 82. When the solenoid 82 is deenergized, the three-way valve 80 delivers through the recirculating conduit 84 which returns the material to the gel tank 72. When the solenoid 82 is energized, the three-way valve 80 delivers the gelling agent through the conduit 86 to the second inlet 155 of the foam head 70.

The conduit 68 connects to the first inlet 88 of the valve head 90 of the foam head 70. The valve head 90 includes a valve inlet chamber 92 containing a valve seat 94 in which is seated the valve head 96. The valve head connects through the valve stem 98 by suitable nuts with a movable plate 121 above the valve head 90. The valve head 90 is provided with a bushing 123 of suitable plastic surrounding the valve stem 98 for sealing the chamber 82. The valve plate 121 is rigidly connected by a plurality of connectors 125 with an upper valve plate 127. Both valve plates 121 and 127 are slidably mounted upon the guide rods 129 extending between the valve head 90 and a ring 131. The valve head 90 and the ring 131 are fastened to the cylindrical casing 133 by suitable screws 135. The cylindrical casing 133 is fastened at the top by the screws 135 to a top plate 137 which supports the upper end of an air cylinder 139.

This air cylinder 139 is supplied with air at its lower end by an air supply conduit 141 controlled by a three-way solenoid air valve 143 which shuts off the supply of air from the supply conduit 145 when the solenoid 147 is deenergized and connects the cylinder 139 to the exhaust outlet 149. The piston within the air cylinder 139 is connected by a piston rod 151 and a connector 153 with the upper plate 127. The gelling agent conduit 86 connects to the second inlet 155 which connects through a small passage 157 with the second valve 159 which is slidably mounted within the valve head 90 provided with the plastic bushing 187. This valve 159 cooperates with the valve seat 160 in the valve plate 161. The outlet of the valve seat 160 is provided with a check valve 163 of polyethylene or other suitable plastic for preventing any flow of material back into the seat 160 and the passage 157. The valve head 90 is provided with a threaded flange 165 to which connects the discharge casing 167 provided with a conically shaped lower wall portion connecting with an outlet 169 provided with a delivery hose 171. The upper rim of the discharge casing 167 presses into sealing contact with the valve plate 161 which in turn is pressed into sealing contact with the bottom face of the valve head 90. The discharge casing encloses a mixing chamber 173 containing a blade type perforated beater 175. This beater is connected by a stem 177 and a coupling 179, bevel gearing within the housing 181 and a connection 183 to a drive motor 185 which operates at high speed to rotate the beater 175 also at high speed.

Figure 2:
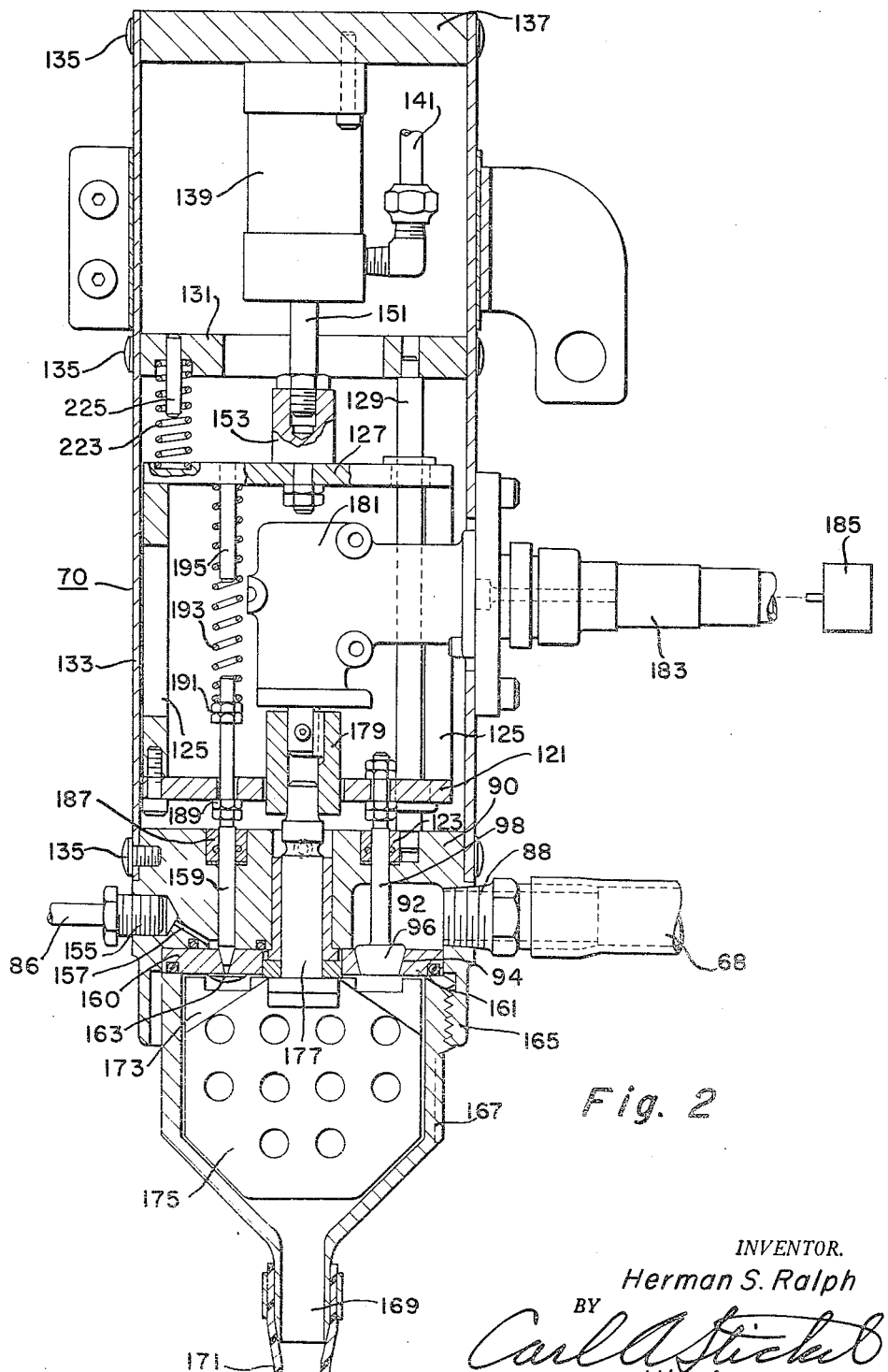
FIGURE 2 is a vertical sectional view through the foam head embodying one form of my invention shown with the valve closed.

Above the plastic bushing 187 are two pairs of nuts 189 and 191 located on opposite sides of the plate 121 through which passes the stem of the valve 159. As shown by comparing FIGURES 2, 3 and 4, this constitutes a lost motion connection between the plate 121 and the nuts 189 and 191. The upper end of the stem of the valve 159 carries a compression type coil spring 193 which surrounds a pin 195 extending downwardly from the plate 127. This spring 193 applies a resilient downward force onto the nuts 191 upon the stem of the valve 159 and normally holding it in engagement with its seat 160 so as to close the supply of gelling agent to the chamber 173. Under such circumstances, the check valve 163 will also be closed.

Figure 3:
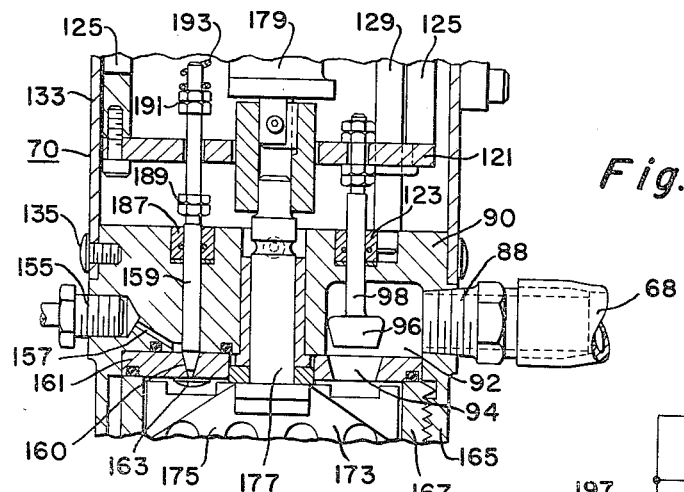
FIGURE 3 is a fragmentary vertical cross-sectional view similar to FIGURE 2 but shown with the foam valve in the partly open position and the gel valve in the closed position.
Figure 6:
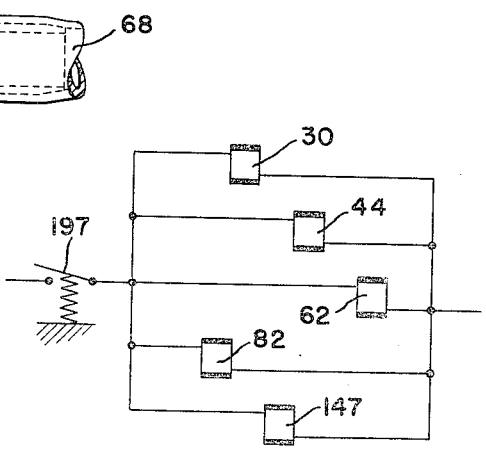
FIGURE 6 is a wiring diagram for the system shown in FIGURE 1.

The instantaneous control for the system is provided by a simple switch 197 incorporated in the pistol grip handle 199 upon the foam head 70. As shown in FIGURE 6, this switch connects in parallel to the five solenoids 30, 44, 62, 82 and 147 for simultaneous energization thereof. As soon as the switch 197 is closed, all the solenoids are energized. The solenoid 147 operates the valve 143 to supply air under pressure to the bottom of the cylinder 139, thereby moving the piston rod 151 and the plates 127 and 121 upwardly. FIGURE 3 shows the plate 121 and the valve 96 at an intermediate position in their upward movement. At the same time, the energization of the solenoids 30 and 44 causes delivery of concentrated latex and air to the foamer 36, which in turn delivers the foam or froth under pressure to the blender 50. The solenoid 62 is energized at the same time to deliver zinc oxide and other compounding ingredients to the blender 50 which mixes these ingredients with the froth or foam supplied by the foamer 36 and delivers them under pressure through the conduit 68 and the first inlet 88 to the chamber 92 from which they pass through the valve seat 94 into the mixing chamber 173.

Figure 4:
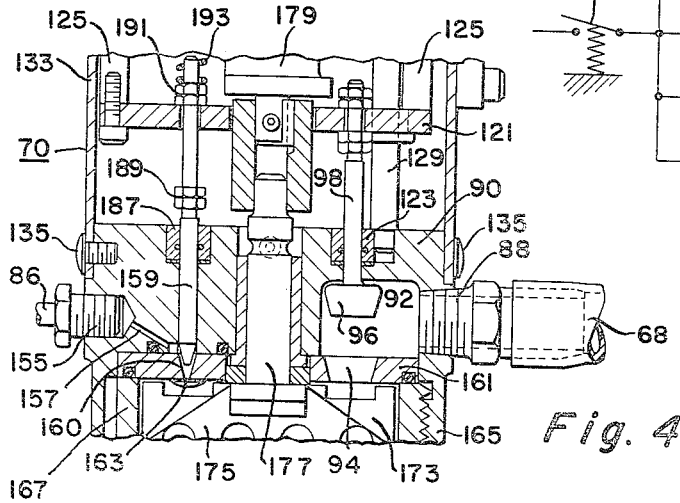
FIGURE 4 is a fragmentary vertical sectional view of a foam head similar to FIGURE 3 but with both valves fully open.

At this time, the solenoid 82 is also energized to deliver the gelling agent through the valve 80 and the conduit 86 and the second inlet 155 to the valve 159. As shown in FIGURE 3, the valve 159 remains in closed position since the plate 121 is between the two sets of nuts 189 and 191 thereon in the midst of the lost motion movement. The piston within the cylinder 139 continues to move upward radially under the supply of air provided by the valve 143. Near the top of this movement the plate 121 engages the upper set of nuts 191 and lifts the valve 159 to the open position, as shown in FIGURE 4, thereby permitting the flow of gelling agent from the passage 157 through the seat 160 and the check valve 163 into the mixing chamber 173. The gelling agent and the supply of foam issuing through the valve seat opening 94 into the chamber 173 are whipped to the desired degree of dispersion by the beater 175 and discharge through the outlet 169 and the hose 171 into the mold 221.

As soon as the mold 221 is filled, the spring switch 197 is released to open and deenergize the solenoids 30, 44, 62, 82 and 147. The deenergization of the solenoid 44 shuts off the valve 42 to stop the supply of air to the foamer 36. The deenergization of the solenoid 30 operates the valve 28 to stop the supply of latex to the foamer and causes the latex to recirculate through the return conduit 32. The deenergization of the solenoid 62 causes a valve 60 to operate to stop the supply of the compounding ingredients through the blender 50 and to recirculate these ingredients to the return conduit 64 to the tank 52. The deenergization of the solenoid 82 causes the valve 80 to operate to stop the supply of gelling agent through the conduit 86 and to recirculate the gelling agent to the return conduit 84 back to the tank 72. The deenergization of solenoid valve 147 connects the interior of the cylinder 139 to the exhaust 149. This causes the compression springs 223 mounted upon the pins 225 extending downwardly from the ring 131 to force the plate 127 and the plate 121 downwardly. At the very beginning of this movement, the plate 121 will move downwardly until the valve 159 returns to the closed position. This is accomplished in the first eighth of an inch of the downward movement. The check valve 163 also closes to prevent any further introduction of gelling agent into the mixing chamber 173 to minimize any gelling therein.

The valve head 96 having been fully opened, as shown in FIGURE 4, continues downward rapidly while some of the foam material continues to be discharged into the mixing chamber 173. This short continued discharge carries the gelling agent out of the mixing chamber 173 to minimize any congealing therein. At the completion of the downward movement of the plate 121 and the valve 96, the supply of foam material to the mixing chamber 173 is stopped. At this time, the conduits 48 and 68 are filled with foam material under pressure. The stopping of the supply of materials and the maintenance of pressure of the materials in the foamer 36, the blender 50 and the conduits 48 and 68 without any further supply of ingredients maintains the materials in the proper proportions and maintains their uniformity during the brief period of time during which the next mold can be presented for filling. When the next mold is presented, the switch 197 is closed and immediately the system returns to operation delivering the foam material and the gell to the mixing chamber 173 for delivery in a properly whipped uniform condition to the next mold. Should the system be shut down for any considerable period, raising the possibility of some congealing within the mixing chamber 173, the distributor casing 167 may readily be removed by unscrewing it for cleaning of any congealed material from it and from the beater 175.

Figure 5:
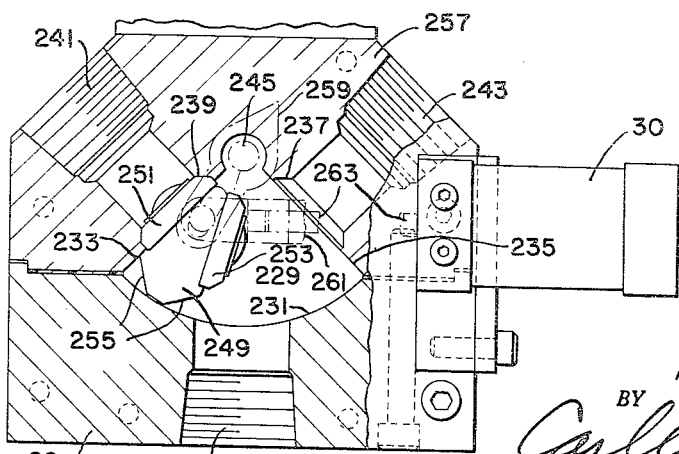
FIGURE 5 is a vertical sectional view of one of the three-way solenoid valves indicated diagrammatically in FIGURE 1.

As shown in FIGURE 5, the three-way valve 28 must be of a special type in which the inlet is continuously open. The conduit 26 connects to the inlet 227, connecting with the valve chamber 229 in the shape of a quarter cylinder. This valve chamber includes a cylindrical wall 231 extending over a fourth of the circumference of a circle with two opposite walls 233 and 235 providing the valve seats 237 and 239. The opening in the valve seat 239 connects to the outlet 241 connecting with the delivery conduit 34. The opening in the valve seat 237 connects with the outlet 243 which connects with the recirculating conduit 32. At the inner section of the walls 233 and 235, there is provided a pivot pin 245 to which is welded a vane type valve 249 provided with valve heads 251 and 253 of polytetra fluoro ethylene or nylon or polyethylene riveted to opposite sides thereof. The remaining faces of the valve chamber cavity 229 are plane perpendicular to the axis of the valve stem 245. The vane 249 makes substantial sealing contact with the parallel plane faces of the cavity 229 and also with the cylindrical surface 231. The vane 249 is made in a wedge shape and has bevelled sides 255 on the thick end nearest the cylindrical surface 231 to prevent the closing of the inlet 227 at any time. This insures the free flow of the concentrated latex from the pump 24 through the conduit 26 and through the valve 28. Outside the housing 257, the pivot pin 245 is provided with a combined crank arm and pointer 259. The crank arm is located at the end opposite the pointer and connects through a connector 261 and a piston rod 263 with the armature of the solenoid 30.

Through this apparatus and control system, I am able to supply at will foam of uniform quantity and quality and to stop the supply whenever desired. This provides a more convenient method of filling the molds and minimizes the waste of material.

While the embodiments of the present invention as herein disclosed constitute preferred forms, it is to be understood that other forms might be adopted.

What is claimed is as follows:

1. Apparatus for producing whipped foam including first and second and third recirculating circuits each comprising a tank and a pump and a three-way valve having a recirculating and a delivery position and conduit means, a foamer having an inlet connected to the three-way valve of the first circuit and having an outlet, a controllable gas supply connected to the foamer for supplying gas to the foamer under high pressure, a blender having an inlet connected to the outlet of said foamer and having an inlet connected to the three-way valve of said second circuit and having an outlet, a foaming head comprising a first inlet and valve connected to the outlet of said blender and a second inlet and valve connected to the three-way valve of said third circuit and a mixing chamber containing a beater connected to the outlets of said first and second valves, said mixing chamber having an outlet for the whipped foam, means for moving said three-way valves to recirculating position and stopping said controllable gas supply in coordination with the closing of said first and second valves of said foaming head.

2. Apparatus for producing whipped foam including first and second and third recirculating circuits each comprising a tank and a pump and a three-way valve having a recirculating and a delivery position and conduit means, a foamer having an inlet connected to the three-way valve of the first circuit and having an outlet, a controllable gas supply connected to the foamer for supplying gas to the foamer under high pressure, a blender having an inlet connected to the outlet of said foamer and having an inlet connected to the three-way valve of said second circuit and having an outlet, a foaming head comprising a first inlet and valve connected to the outlet of said blender and a second inlet and valve connected to the three-way valve of said third circuit and a mixing chamber containing a beater connected to the outlets of said first and second valves, said mixing chamber having an outlet for the whipped foam, and means for moving said three-way valves to delivery position and starting said controllable gas supply in coordination with the opening of said first and second valves of said foaming head.

3. Apparatus for producing whipped foam including first and second and third recirculating circuits each comprising a tank and a pump and a three-way valve having a recirculating and a delivery position and conduit means, a foamer having an inlet connected to the three-way valve of the first circuit and having an outlet, a controllable gas supply connected to the foamer for supplying gas to the foamer under high pressure, a blender having an inlet connected to the outlet of said foamer and having an inlet connected to the three-way valve of said second circuit and having an outlet, a foaming head comprising a first inlet and valve connected to the outlet of said blender and a second inlet and valve connected to the three-way valve of said third circuit and a mixing chamber containing a beater connected to the outlets of said first and second valves, said mixing chamber having an outlet for the whipped foam, means for consecutively opening said first and second valves of said foaming head, and means operable coincidentally to the opening of said first valve for moving said threeway valves to delivery position and for starting said gas supply.

4. Apparatus for producing whipped foam including first and second and third recirculating circuits each comprising a tank and a pump and a three-way valve having a recirculating and a delivery position and conduit means, a foamer having an inlet connected to the three-way valve of the first circuit and having an outlet, a controllable gas supply connected to the foamer for supplying gas to the foamer under high pressure, a blender having an inlet connected to the outlet of said foamer and having an inlet connected to the three-way valve of said second circuit and having an outlet, a foaming head comprising a first inlet and valve connected to the outlet of said blender and a second inlet and valve connected to the three-way valve of said third circuit and a mixing chamber containing a beater connected to the outlets of said first and second valves, said mixing chamber having an outlet for the whipped foam, means for consecutively closing said second and first valve of said foaming head, and means operable coincidentally to the closing of said second valve for moving said three-way valves to recirculating position and stopping said gas supply.

5. Apparatus for producing whipped foam including first and second and third recirculating circuits each comprising a tank and a pump and a three-way valve having a recirculating and a delivery position and conduit means, means interlinking the pumps of asid second and third circuits to maintain a desired ratio of delivery, a foamer having an inlet connected to the three-way valve of the first circuit and having an outlet, a controllable gas supply connected to the foamer for supplying gas to the foamer under high pressure, a blender having an inlet connected to the outlet of said foamer and having an inlet connected to the three-way valve of said second circuit and having an outlet, a foaming head comprising a first inlet and valve connected to the outlet of said blender and a second inlet and valve connected to the three-way valve of said third circuit and a mixing chamber containing a beater connected to the outlets of said first and second valves, said mixing chamber having an outlet for the whipped foam, and means for moving said three-way valves to recirculating position and stopping said controllable gas supply in coordination with the closing of said first and second valves of said foaming head.

6. A system for producing whipped foams including a blender, means for mixing latex and a gas and supplying the mixture to the blender, means for supplying a vulcanizing agent to the blender, a foaming head connected to the blender, means for supplying a gelling agent to the foaming head, said foaming head including separate coordinated valve means for controlling the supply from said blender and the supply of gelling agent, and means coordinated with the closing of said valve means for stopping the supply of the latex and the gas and the vulcanizing agent.

7. Apparatus for producing whipped foam including a foaming head provided with a mixing chamber having an outlet for the whipped foam and being provided with a beater within the mixing chamber, said head being provided with a first inlet and first inlet valve means for foam and a second inlet and a second inlet valve means for gelling agent, and automatic means for consecutively opening said first and second valves and for consecutively closing said second and first valves in the order named.

8. Apparatus for producing whipped foam including a foaming head provided with a mixing chamber having an outlet for the whipped foam and being provided with a beater within the mixing chamber, said head being provided with a first inlet and first inlet valve means for foam and a second inlet and a second inlet valve means for gelling agent, said first valve means having a greater opening and closing movement than the second valve means, and controllable means operatively connected to said first valve means and having a lost motion connection with the second valve means of less lost motion than the movement of the first valve means for opening the second valve means after the opening of the first valve means.

9. Apparatus for producing whipped foam including a foaming head provided with a mixing chamber having an outlet for the whipped foam and being provided with a beater within the mixing chamber, said head being provided with a first inlet and first inlet valve means for foam and a second inlet and a second inlet valve means for gelling agent, and controllable means for consecutively opening said first and second valves and for consecutively closing said second and first valves in the order named, first and second and third recirculating circuits each comprising a tank and a pump and a three-way valve each having recirculating and delivery positions and outlets and conduit means, electrical operating means for each of said three-way valves, a foamer for incorporating a gas having an inlet connected to the delivery outlet of the three-way valve of said first circuit and having an outlet, a gas supply provided with a control valve having an electrical operating means for supplying a gas to said foamer, a blender having its inlet connected to the outlet of said foamer and to the outlet of the three-way valve of said second circuit and having its output connected to the first inlet of said head, conduit means connecting the outlet of the three-way valve of said third circuit with said second inlet of said head, said controllable means including means coincidentally energizing said electrical operating means.

References Cited in the file of this patent

UNITED STATES PATENTS

| | | |
|---|---|---|
| 2,035,747 | Harris | Mar. 31, 1936 |
| 2,295,740 | Keen | Sept. 15, 1942 |
| 2,376,281 | Schott et al. | May 15, 1945 |
| 2,658,736 | Alderfer | Nov. 10, 1953 |
| 2,673,723 | Keen | Mar. 30, 1954 |
| 2,706,108 | Miner | Apr. 12, 1955 |
| 2,731,253 | Spencer | Jan. 17, 1956 |
| 2,912,012 | Klingler | Nov. 10, 1959 |
| 2,970,817 | Gurley | Feb. 7, 1961 |
| 2,971,748 | Ellegast | Feb. 14, 1961 |
| 3,051,455 | Magester | Aug. 28, 1962 |
| 3,067,989 | Ballou et al. | Dec. 11, 1962 |

FOREIGN PATENTS

| | | |
|---|---|---|
| 476,149 | Italy | Nov. 28, 1952 |